INVENTOR
JAMES H. CYPHER

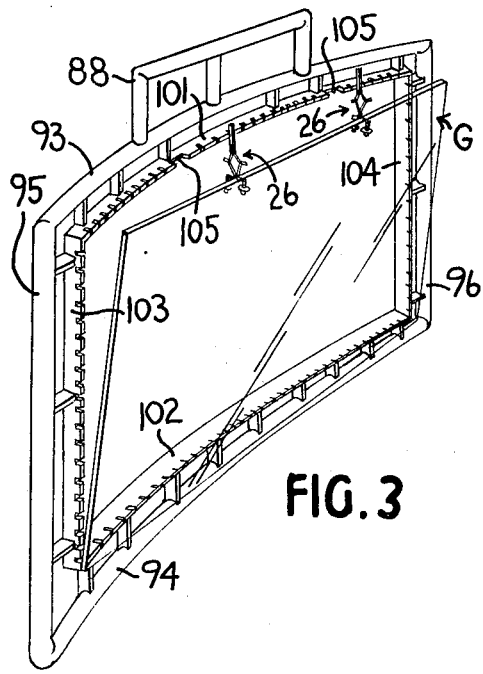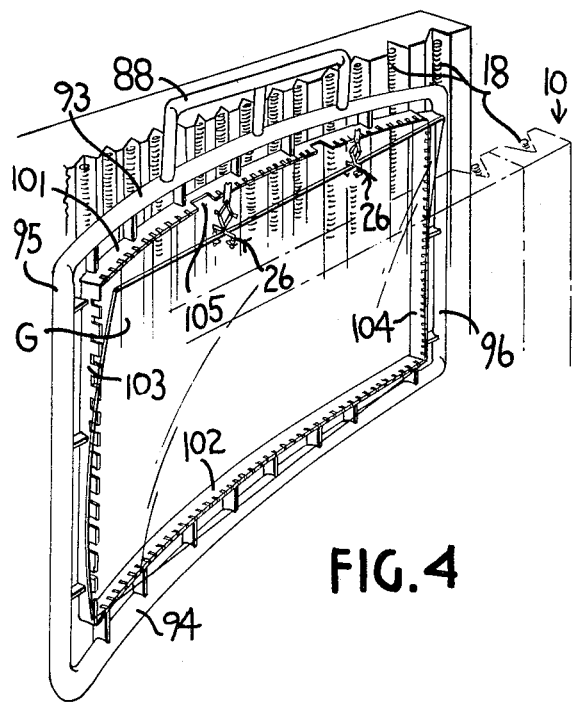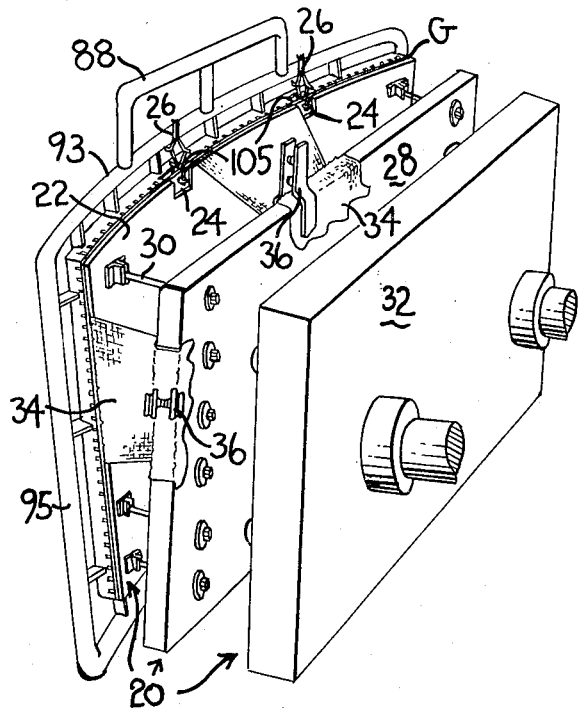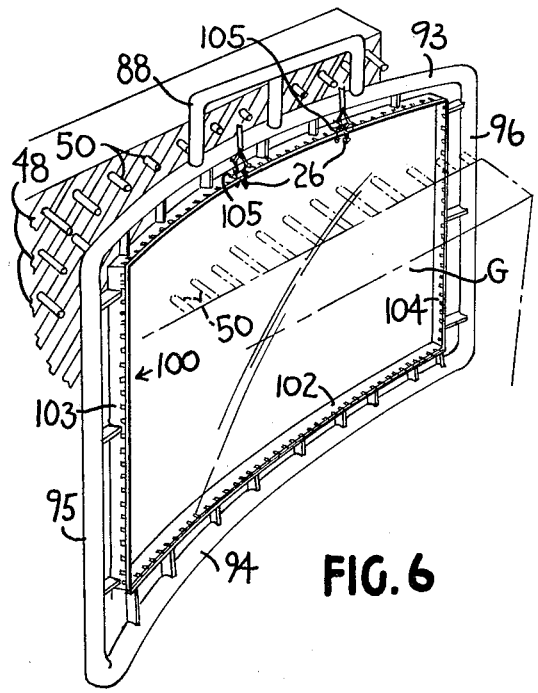

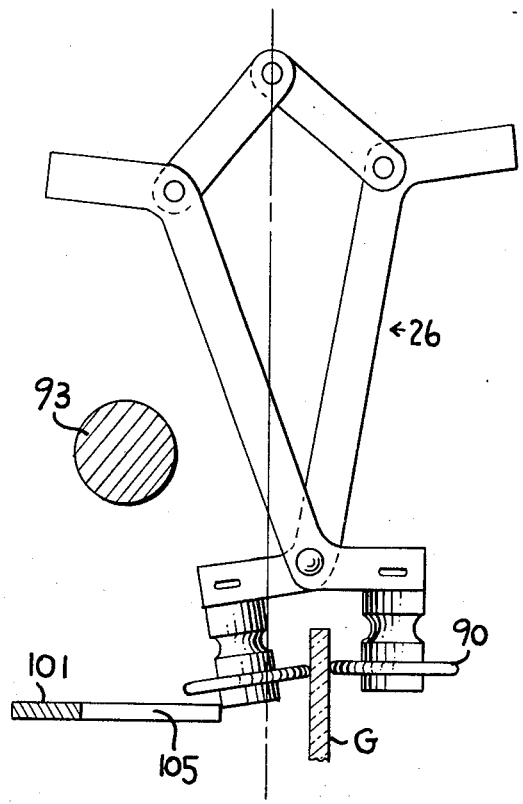
FIG. 7
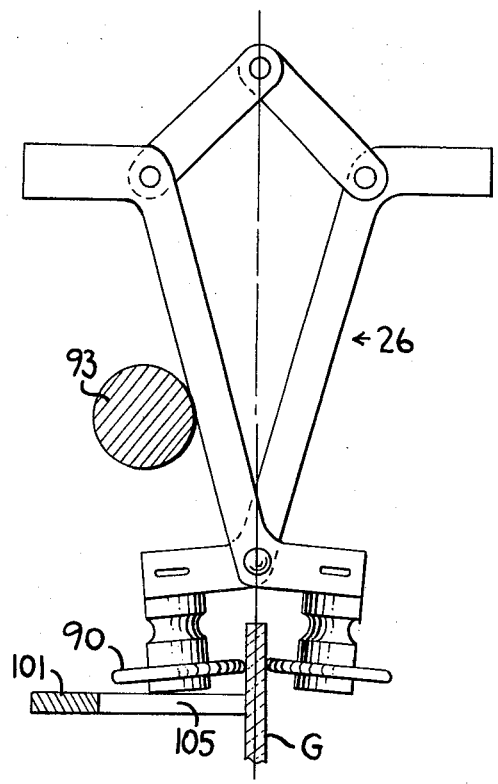
FIG. 8
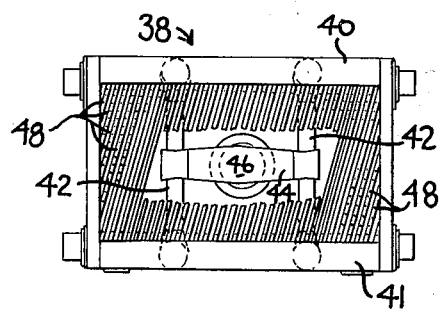
FIG. 9
FIG. 10
INVENTOR
JAMES H. CYPHER

United States Patent Office 3,510,286
Patented May 5, 1970

3,510,286
METHOD AND APPARATUS FOR BENDING AND TEMPERING GLASS SHEETS
James H. Cypher, New Kensington, Pa., assignor to PPG Industries, Inc., a corporation of Pennsylvania
Filed Aug. 12, 1966, Ser. No. 572,043
Int. Cl. C03b 23/02, 27/00
U.S. Cl. 65—104
8 Claims

ABSTRACT OF THE DISCLOSURE

An outline shaping surface is supported in an oblique plane by a carriage. The outline shaping surface has an upper shaping rail having at least one notch in it. A pair of tongs suspended from the carriage hangs freely within the notch. A glass sheet is partially supported by the tongs near its upper edge, and the lower edge of the glass engages the lower portion of the outline mold to support the glass in a second oblique plane. During heating, the glass sags by gravity toward the outline mold and increases its contact with the mold. Then the glass is pressed between a pair of complementary shaping members having shaping surface conforming to that of the outline mold while the glass is closely adjacent to the mold. The shaping members have a notched upper edge in alignment with the notches in the outline mold. The members are retracted and the glass sheet, while supported on the outline shaping surface, is tempered.

---

This invention relates to treating glass sheets, and particularly relates to the shaping and tempering of thin glass sheets. For the purposes of the present invention thin glass is defined as glass having a nominal thickness of $3/16$ inch and less.

Tempered glass is characterized by a skin that is stressed in compression completely surrounding an interior core that is stressed in tension. In order to produce tempered glass, a glass sheet is first heated to a temperature well above its strain point, and approaching its softening point. Such a temperature is preferably substantially uniform through the glass thickness in any given area although it may vary from area to area when differential tempering is desired. The elevated temperature required for tempering is higher than the temperature needed to deform the glass sheet.

After the glass sheet has obtained a sufficiently high temperature, it is suddenly chilled by quenching. This latter step is usually accomplished by applying cold air jets rapidly against the opposite surfaces of the heat softened sheet while providing relative movement between the sheet and the jets. The secret of an effective tempering operation is to chill the glass so rapidly that its surface regions are cooled through the annealing range of the glass to its strain point where the surface becomes set while the interior remains above the strain point and is still plastic.

It is well known that the portions of the glass sheet that cool through the annealing range before other portions develop a compression stress whereas the other portions develop a tension stress when the entire glass sheet cools and remains permanently below the strain point. Since glass is notoriously strong when stressed in compression and weak when stressed in tension, the glass skin stressed in compression provides a protective coating that causes the glass to be much stronger than untempered glass in its resistance to fracture. Another factor in rendering tempered glass safer than untempered glass is that tempered glass breaks up into very small fragments having smooth surfaces in the less frequent instances when it does fracture. These smoother particles of fractured tempered glass or "dice" are far less harmful to occupants of a vehicle than fractured untempered glass, which fractures more readily than tempered glass and, upon fracturing, produce pieces having jagged edges that very dangerous.

In the past, requirements for automotive tempered glass has required glass of a nominal thickness of ¼ inch. Glass of such thickness was relatively easy to temper by the air quenching technique described above because the interior of the glass was sufficiently massive to retain a source of heat that retarded the cooling rate of the interior of the glass while the exterior was chilled to below the strain point. However, when the automotive designers started to require thinner glass for tempered glass window closures for the automobiles, it became more difficult to maintain a temperature gradient between the surfaces and the interior of the glass sheet undergoing tempering because there was less distance along which to establish an effective temperature difference between the surface and the interior and because the relative thinness of the glass left a much smaller interior mass in which to store the interior heat.

One method developed for bending and tempering thin glass sheets is the so-called gas hearth method. A typical gas hearth operation is disclosed and claimed in U.S. Pat. No. 3,223,501 to James C. Fredley and George E. Sleighter. This method, developed by PPG Industries, Inc., formerly called the Pittsburgh Plate Glass Company, floats a succession of glass sheets on a relatively hot fluid bed until the glass is at a temperature sufficiently hot for tempering. At this point, the glass is suddenly quenched by chilling while still being supported with its major surfaces in contact only with fluid. The gas hearth method, by its very efficient heat exchange, enables very thin glass on the order of ⅛ inch thickness to be either tempered or bent and tempered.

The aforesaid invention, while a tremendous step forward in the glass fabrication art, rendered a lot of existing equipment obsolescent if not obsolete. The present invention makes it possible to continue to use existing equipment that was developed for bending and tempering relatively thick glass sheets without requiring major modifications of the type necessitated by conversion to the gas hearth type of operation.

The present invention comprises several inventive concepts, taken either singly or in combination. A glass sheet is supported in an oblique plane at a small acute angle to the vertical with a lower portion thereof engaged by a lower portion of an outline shaping surface tilted at a slightly greater angle from the vertical while the glass is heated. The outline shaping surface is disposed in a position to receive the outline of one side of the glass sheet as the sheet sags to increase its portion in contact with the outline shaping surface during the passage of the sheet through a furnace.

The glass is heated to a temperature above its deformation temperature while transported through the furnace and when it reaches a temperature sufficient for tempering, is removed from the furnace while supported at least in part on a greater portion of the tilted outline shaping surface than that which contacted the flat glass initially.

The heat softened glass sheet with at least a portion of its marginal portion shaped to conform to the outline shaping surface, is then sandwiched between a pair of glass shaping members that engage the thin heat softened glass sheet within the outline of the outline shaping surface to press the glass to its desired configuration. The shaping members are held in pressurized engagement for sufficient time to insure that the glass sheet retains the shape imparted thereto. The shaping members are then retracted.

The shaped glass sheet, while supported against the outline shaping surface, is quenched by applying blasts of chilling fluid against the opposite surfaces of the still heated press bent glass sheets. The upper edge of the glass sheet is engaged throughout the heating, shaping and quenching steps described above.

Refinements that may be used with the present invention either singly or in combination include applying the chilling fluid at different rates of flow against the opposite major surfaces of the bent glass sheet so that the bent glass is held against the outline shaping surface during its quenching by the difference in fluid force applied against the opposite surfaces. Also, the glass sheet may be gripped at its upper edge by tongs to provide said upper edge engagement so as to tend to suspend the sheet in free vertical support in combination with engaging the lower portion of the glass sheet by the lower edge of the obliquely disposed outline shaping surface.

A typical apparatus for performing the present invention will now be described in order to facilitate understanding of the present invention.

In the drawings which form part of the invention and wherein like reference numbers refer to like structural elements, FIG. 1, is a longitudinal elevation of a part of a heating furnace, a shaping station and a quenching apparatus for performing the present invention;

FIGS. 3, 4, 5 and 6 are perspective views showing the relation of a glass sheet to the bending apparatus during loading (FIG. 3), during heating (FIG. 4), while the glass is being pressed to shape (FIG. 5), and while the glass is being quenched (FIG. 6);

FIG. 7 is an enlarged sectional view of a portion of the apparatus depicted in FIG. 2, showing how the tongs engage the upper edge of the glass sheet and the relation of the glass sheet to the outline shaping surface when the glass is first loaded for transport through the heating furnace;

FIG. 8 is a view similar to FIG. 7, showing the relative position of the tongs and the upper edge of the glass sheet to a portion of the outline shaping surface after the glass has been sagged to shape in the furnace;

FIG. 9 is a fragmentary front elevation showing how pipes of a quenching apparatus are arranged to face a glass sheet in the quenching apparatus of FIG. 1; and FIG. 10 is an enlarged view of an individual nozzle showing how the latter is connected to one of the air supply pipes of the apparatus of the preceding figure.

Figure 1:
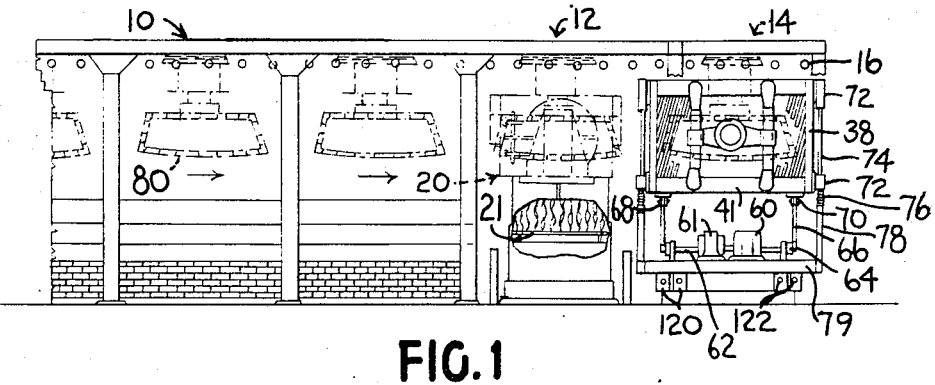

Referring to the drawings, FIG. 1 shows an illustrative apparatus for bending and tempering thin glass sheets using the principles of the present invention. The apparatus comprises a tunnel-like furnace 10 disposed in end to end relation with a glass shaping station 12 and a glass quenching station 14. An overhead conveyor 16 comprising a plurality of conveyor rolls mounted in longitudinally spaced relation along a suitable support extends through the furnace 10, the glass shaping station 12 and the glass quenching station 14.

The tunnel-like furnace used for heating glass sheets to their deformation temperature is provided with electrical heating elements 18 (FIG. 4) along its opposite walls. The heating elements irradiate the glass sheets as the latter traverse the furnace 10. The intensity of the radiant heaters is correlated with the speed of the glass sheets moving through the furnace to have each glass sheet reach a desired temperature as it leaves the furnace 10.

The shaping station 12 is located immediately beyond the furnace and in longitudinal alignment therewith and comprises a pair of glass shaping members 20. Only one of the shaping members is shown from the rear view in FIG. 1. The shaping members 20 are of the conventional type having substantially continuous complementary shaping surfaces opposing one another. An elongated, apertured gas pipe 21 extends lengthwise of the shaping station.

Each shaping member comprises a shaping plate 22 (see FIG. 5) suitably notched at its upper portion 24 to receive tongs 26. The shaping plate 22 is shaped to the curvature desired for a glass sheet G after the latter is bent. The shaping plate 22 is secured to a flat, relatively rigid, rectangular plate 28 by a series of connectors 30. Plate 28 is in turn connected to a piston plate 32 by additional connectors (not shown). The tongs 26 serve as means for engaging the upper edge of the glass sheet in the illustrative embodiment.

A cover of knit stretchable fiber glass cloth 34 (parts of which are cut away to show other portions of the shaping member) is mounted to encompass each shaping plate 22 and is secured along the perimeter of the rectangular plate 28 by a series of clamps 36.

The piston plate 32 is attached to a piston which is movable to cause the glass shaping members 20 to move between a closed position in which they engage the opposite surfaces of a heat-softened glass sheet in pressurized engagement to shape the latter, and a retracted position. In the latter position, the shaping members 20 permit glass sheets to move into and out of the glass shaping station 12.

The glass quenching station 14 comprises a pair of opposed plenum chambers 38, one of which is shown in FIG. 9. Each plenum chamber comprises a series of upper and lower horizontally extending pipes 40 and 41, respectively, which are fed from branching feed pipes 42. The latter extend vertically in both directions from a common horizontal pipe 44. The latter extends horizontally outward in two directions from a main supply duct 46. The latter, in turn, is connected through a flexible connector (not shown) to a source of air under pressure such as a blower (also not shown).

A timer control circuit and a valve serves to control the rate of flow and whether there is any air flow into the supply duct 46. Such apparatus for controlling the rate of fluid flow and the duration of fluid flow at different rates is available in the open market and forms no part of the present invention even though it is included in the illustrative embodiment.

A plurality of air pipes 48 extends obliquely from the upper and lower horizontal pipes 40 and 41 and are provided with individual nozzles 50 disposed to cause air to flow outward from the oblique pipes 48. The air pipes are spaced equally from one another and are parallel to one another.

Each nozzle 50 is shown in FIG. 10 to comprise a main nozzle portion 52 externally threaded to be received within a hexagonal nut 54 welded to the outer wall of a pipe in surrounding relation to an aperture 56 therein. A flexible extension member 58, which may be composed of a closely wound spring, a tube of silicone rubber, or the like, has its inner end securely fastened over the outer surface of the nozzle portion 52. The length of the extensions 58 vary depending upon their point of attachment to the nozzle portions 52. The length of each nozzle extension 58 is chosen to provide uniform distance between the nozzle orifice and the major glass surface portion the nozzle faces regardless of the shape of the glass being quenched.

It is well known that it is necessary to have a continuous relative movement between the glass and the nozzles through which air is applied under pressure during the quenching operation in order to minimize iridescent markings on the glass. A motor 60 (FIG. 1) operating through a speed reducer 61 actuates a drive shaft 62 containing eccentric drives 64 at the ends thereof. Each eccentric drive 64 is pivoted to the lower end of a connecting link 66. The upper end of the connecting link 66 is pivotally secured to a bracket 68 through a pivot pin 70. The bracket 68 is rigidly secured to the lower surface of the lower horizontal pipe 41 of one of the plenum chambers 38.

A plurality of sleeves 72 are secured to each side of the plenum chamber 38 and ride on vertical shafts 74. Compression springs 76 are carried along each shaft between the lower sleeves 72 and supports 78 mounted on a platform 79 that also supports the motor 60 and its driven apparatus.

When the motor 60 operates, it rotates drive shaft 62 through speed reducer 61 to cause the plenum chambers 38 to reciprocate vertically in paths defined by shafts 74 while air is imparted through the nozzles 50 extending from the oblique pipes 48. The oblique pipes 48 are arranged at an angle to the vertical such that a 6 inch reciprocation in a vertical direction causes the area of glass swept by each air blast to overlap that swept by adjacent blasts. Having the nozzles on a 2 inch separation along the length of each pipe and having the pipes 2 inches apart in a direction normal to the pipe lengths with a 6 inch reciprocation and a five inch space between opposing sets of nozzles provides a good overall coverage for quenching the glass.

Figure 2:
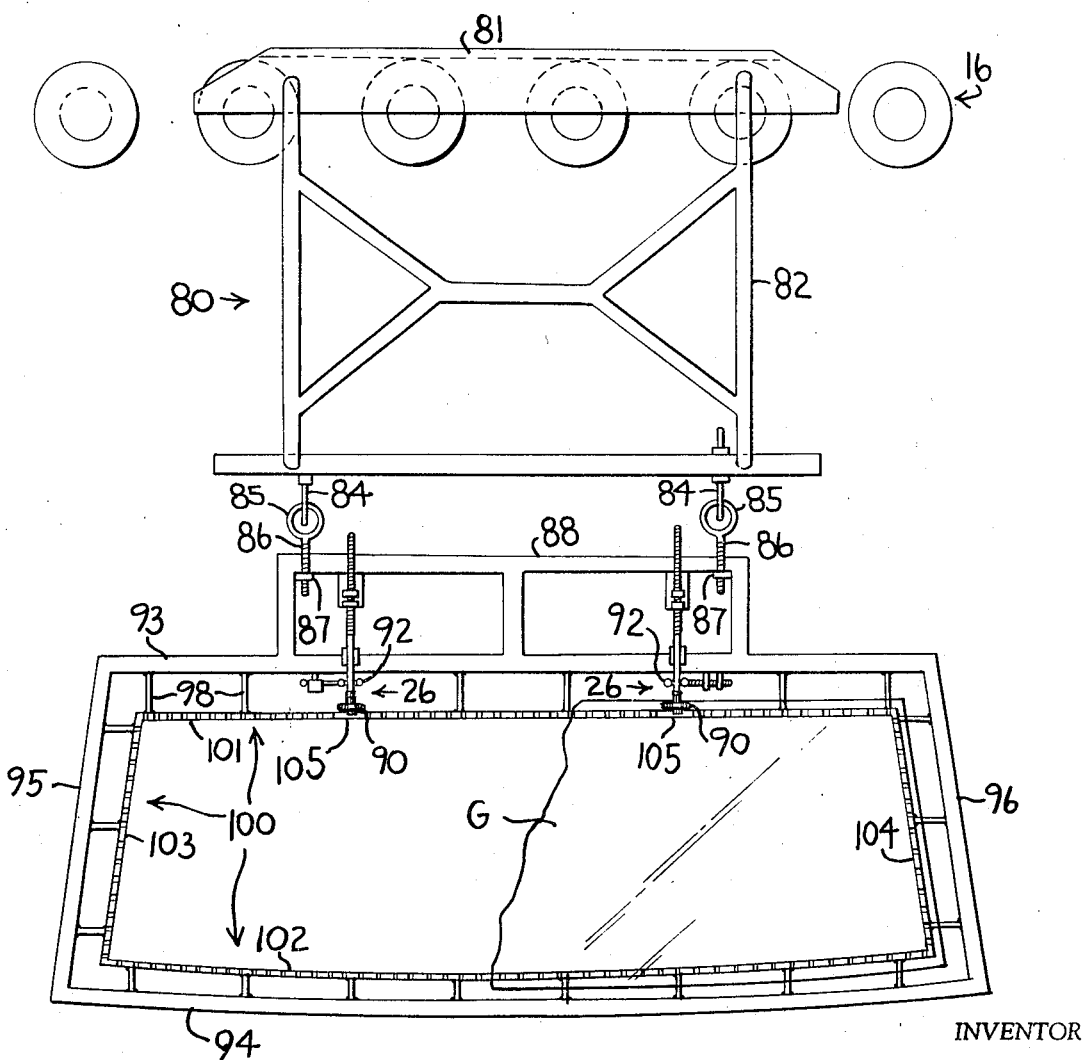
FIG. 2 is a front elevation of a preferred example of apparatus comprising an outline shaping surface and tongs, showing how the apparatus is constructed for supporting a glass sheet for conveying the latter through the apparatus of FIG. 1.

A unique carriage for supporting a glass sheet G is shown in FIG. 2. The carriage 80 comprises an overhead runner 81 that runs along the rolls of conveyor 16 when the latter rotate. An open frame structure 82 is attached from the runner 81 and supports a plurality of hooks 84 at its lower end.

A novel glass supporting structure illustrating the present invention comprises a plurality of eyes 85 each suspended from a hook 84 and provided with a threaded stem 86. The latter is attached to an internally threaded flange 87 carried by a lower frame 88. The pair of tongs 26 is suspended in freely hanging relation from the lower frame 88.

The tongs 26 are provided at their lower ends with glass engaging members of the pivotal disc type 90. Tong guides 92 are attached to the lower frame 88 to restrain the tongs 26 from pivoting in a direction parallel to the major surfaces of the glass while allowing free pivoting in a direction normal to the major surfaces of a glass sheet suspended therefrom.

The lower frame 88 comprises upper and lower horizontal reinforcement members 93 and 94 interconnected at their ends by interconnecting end reinforcement members 95 and 96. The latter extend in an oblique plane.

The reinforcement members 93, 94, 95 and 96 are interconnected by a series of webs 98 to an outline shaping surface 100 that is interior of the reinforcement members and substantially equidistant therefrom throughout its entire length. The shaping surface 100 comprises an upper shaping rail 101, a lower shaping rail 102 and end shaping rails 103 and 104. The upper shaping rail 101 is provided with notches 105 aligned in vertical planes with the position occupied by the glass engaging members 90 for permitting arcuate movement of the tongs 26 in the plane allowed by guide members 92.

Initially, a flat glass sheet G is mounted for bending by engaging its upper edge with a pair of tongs 26 in the vicinity of the outline shaping surface 100. If the glass sheet is to be bent to a compound bend, both of the horizontal shaping rails 101 and 102 are concavely curved along their horizontal length dimension and the end shaping rails 103 and 104 are concave in their vertical dimension. All the rails are serrated for air escape.

The shaping surface 100 is supported in a generally oblique plane with the corners formed by the end shaping rails 103 and 104 with the upper horizontal shaping rail 101 aligned in an oblique plane with the corners formed by the lower ends of the end shaping rails 103 and 104 and the lower horizontal shaping rail 102. Since the glass sheet G is rigid when first mounted, the tongs 26 are pivoted outward away from the notches 105. FIGS. 3 and 7 show how the glass is first supported in a near vertical plane relative to the outline shaping surface 100 with the lower horizontal shaping rail 102 serving as means for engaging the glass sheet G near its lower edge and FIG. 7 shows an enlargement of how the tongs 26 are pivoted in an outward direction away from the notches 105 in order to support the glass.

As the glass is mounted preparatory to bending, it contacts the lower portion only of the outline shaping surface 100 with the tongs 26 providing a slight force tending to return the glass to a vertically suspended position in which the glass hangs freely from the tongs 26. As the glass sheet progresses through the tunnel-like furnace 10 as shown in FIG. 4, the lower portion of the glass gradually increases its line of engagement with the outline shaping surface 100. The tongs 26, by tending to pivot into a freely hanging vertical position, help conform the glass sheet G to the shape of the outline shaping surface 100.

By the time the glass sheet reaches the glass shaping station 12, it has conformed substantially entirely around its entire periphery to the outline shaping surface 100 and the glass engaging discs 90 of the tongs 26 have passed through the notches 105 in the upper shaping rails 101 of the outline shaping surface 100. The glass shaping members 20 move into pressurized engagement with the opposite surfaces of the glass sheet, with the shaping member having a concave shaping plate moving through the outline shaping surface 100 a slight distance (a small fraction of an inch) and the convex shaping member stopping short of the shaping surface 100 so as to engage the glass sheet in pressurized engagement a very slight distance beyond the shaping surface formed on the shaping rails of the outline shaping surface 100.

The notches 24 of the shaping plate 22 of the shaping members 20 are in alignment with the notches 105 of the upper shaping rail 101 of the outline shaping surface 100 when the glass sheets are being engaged in pressurized engagement. This permits freedom of movement for the tongs 26 to conform to any variation in shape of the glass sheet.

The shaping members 20 are retracted and the shaped glass sheet, partially supported on the outline shaping surface 100 and gripped by the tongs 26, arrives between the plenum chambers 38. There, air under pressure is applied against the opposite surfaces of the bent glass sheet and the plenum chambers reciprocated vertically in such a manner as to insure that the entire glass sheet is quenched by air under pressure.

In a typical operation given by way of example to show a working embodiment of the present invention, glass sheets having a nominal thickness of ⅛ inch were heated by passing them serially through a furnace supported by tongs and on an outline shaping surface of the type described hereinabove to reach a surface temperature of 1220 degrees Fahrenheit. Two minutes in the furnace sufficed for this heating. The glass sheet, on obtaining a surface temperature of 1220 degrees Fahrenheit was transferred to the shaping station 12 in 4¾ seconds. When the glass reached the shaping station 12, it took 2 seconds for the shaping members to engage the glass in pressurized engagement. The shaping members were held in pressurized engagement against the glass for 4 seconds. The glass remained at the shaping station an additional 4 seconds while the shaping members were separated from one another. Then, the bent glass sheet was transferred to the quenching station 14.

The elongated burner below the shaping members was a ¾ inch diameter apertured pipe having upward facing apertures fabricated using a #28 drill having a diameter of 0.1405 inch. The apertures were equally spaced ⅝ inch apart center to center. Natural gas was supplied at a pressure of 9 ounces per square inch to the gas pipe and burned at the apertures as it escaped from the pipe and mixed with air at the shaping station to form flames extending upward a sufficient distance to engulf the glass sheet.

The nozzle extensions 58 were of such lengths that they opposed one another at 5 inch spacing with the glass centrally disposed between them. The plenum chambers 38 were reciprocated through a 6 inch stroke with nozzles of 3/16 inch inner diameter separated 2 inches apart along each pipe length applying a pressure of 16 pounds per square inch on the concave glass surface and 18 pounds per square inch on the convex glass surface when 1/8 inch thick glass sheets of commercial plate glass were being quenched.

When 1/8 inch nominal thickness plates of commercial sheet glass were being quenched, the same kind of sequence was followed except that a pressure of 22 pounds per square inch was applied on the concave glass surface and 24 pounds per square inch against the convex glass surface during the quenching. All pressures were measured in the header so that the pressures at the nozzles were somewhat less than the measured pressures reported.

In order to facilitate the resetting of nozzle extensions 58 to conform to a different shape of glass sheet whenever a production change is required, each plenum chamber 38 is readily retracted from its operative position. To accomplish this object, each platform 79 on which each plenum chamber 38 is mounted is provided with downwardly extending ears 120 supported in sliding relation on guides 122. The latter extend transverse to the length of the conveyor 16 and are spaced on opposite sides from the vertical plane containing the conveyor 16.

The present invention has made it possible to continue to use furnaces and quenching equipment that have been in existence previously for tempering thicker glass sheets. It was unnecessary to convert the production of all of these parts having a nominal thickness of 1/8 inch to a gas hearth type of equipment. Considerable investment was saved and cost of converting the equipment reduced to that needed to apply a higher pressure for quenching than has been the case previously and for providing new sets of glass support carriages which would have been needed for the new patterns in any event.

The form of the invention shown and described in this disclosure represents an illustrative descriptive embodiment thereof. The glass sheet may be pressed while at least a portion thereof remains in contact with said outline shaping surface. Also, it is understood that if the glass sheet is small enough to be gripped by a single set of tongs in a manner well known in the art, a single notch would suffice to provide clearance for the single set of tongs. These and other variations are encompassed in the spirit of the present invention.

What is claimed is:

1. A method of bending and tempering glass sheets comprising at least partially supporting a glass sheet near its upper edge, engaging said glass sheet at least in part near its lower edge to support said glass sheet in an oblique plane oriented at a first acute angle to a vertical plane along a lower portion of an outline shaping surface oriented at a second acute angle to a vertical plane, heating said glass sheet while so supported to its deformation temperature until the heated glass sheet sags by gravity to increase its contact with said outline shaping surface, engaging the opposite major surfaces of said glass sheet in pressurized contact throughout substantially their entire extent between a pair of complementary shaping members having shaping surfaces conforming to that of said outline shaping surface while said heated glass sheet is closely adjacent to said outline shaping surface to bend said glass sheet into conformity with said complementary shaping members, supporting said bent glass sheet obliquely on said outline shaping surface while retracting said complementary shaping members away from said bent glass sheet, and quenching said bent glass sheet by applying cold fluid against both major surfaces of said bent glass sheet while supporting said sheet obliquely with one major surface thereof contacting said outline shaping surface to temper the bent glass sheet.

2. A method as in claim 1, wherein said glass sheet is gripped at its upper edge portion by tongs throughout its heating, shaping and quenching.

3. A method as in claim 1, wherein said glass sheet contacts at least part of said outline shaping surface when it is sandwiched between said complementary shaping members.

4. A method as in claim 1, wherein said quenching step comprises applying cold fluid at a greater rate of flow against a major surface of said bent glass sheet opposite that in contact with said outline shaping surface than against said one major surface.

5. Apparatus for supporting a glass sheet for conveyance through a furnace, a shaping station and a quenching zone, said apparatus comprising:
  (I) an outline shaping surface comprising:
    (a) an upper shaping rail having at least one notch therein,
    (b) a lower shaping rail for engaging said sheet,
    (c) end shaping rails extending between said upper and lower shaping rails,
  (II) means for supporting said outline shaping surface in an oblique plane, and
  (III) a pair of tongs suspended from said supporting means and located to hang freely within said notch.

6. Apparatus as in claim 5, wherein at least one of said shaping rails has a concave surface adapted to face a surface of a glass sheet adjacent a marginal portion thereof when said glass sheet is supported by said tongs.

7. Apparatus as in claim 5, further including:
  (IV) a pair of glass shaping members having complementary shaping surfaces conforming to the shape of said outline shaping surfaces and comprising a notched upper edge portion in alignment with said notch in said upper shaping rail, and
  (V) means for providing relative movement of said glass shaping members between a glass engaging position and a retracted position.

8. Apparatus as in claim 7, wherein said outline shaping surface (I) is slightly smaller in size and substantially proportional in outline to the shape of the glass sheet after bending and is at least partly concave relative to an oblique plane passing through spaced points along said upper and lower shaping rails, and said pair of glass shaping members (IV) comprise a shaping member having a concave shaping surface conforming to that of said outline shaping surface and an outline slightly smaller than that of said outline shaping surface, said means (V) for providing relative movement between said glass shaping members being constructed and arranged in such a manner relative to said shaping member (IVb) having said concave shaping surface to move said shaping member (IVb) between its said retracted position wherein its concave shaping surface is recessed behind said outline shaping surface and a glass engaging position wherein its concave shaping surface is adjacent to but slightly in front of said outline shaping surface.

References Cited

UNITED STATES PATENTS

| | | | |
|---|---|---|---|
| 3,294,516 | 12/1966 | Carson et al. | 65—287 |
| 3,346,358 | 10/1967 | Thomas | 65—106 |
| 2,518,896 | 8/1950 | Jendrisak | 65—287 XR |

S. LEON BASHORE, Primary Examiner

S. R. FRIEDMAN, Assistant Examiner

U.S. Cl. X.R.

65—107, 114, 268, 287, 289